United States Patent
Kanchwala et al.

(10) Patent No.: US 7,623,684 B2
(45) Date of Patent: Nov. 24, 2009

(54) SYSTEM AND METHOD FOR INFORMATION HANDLING SYSTEM SOFTWARE REGISTRATION CODE MANAGEMENT

(75) Inventors: Rukaiya Kanchwala, Austin, TX (US); Reva Tolliver, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 749 days.

(21) Appl. No.: 11/184,222

(22) Filed: Jul. 19, 2005

(65) Prior Publication Data

US 2007/0038573 A1 Feb. 15, 2007

(51) Int. Cl.
*G06K 9/00* (2006.01)

(52) U.S. Cl. .................. 382/115; 382/305; 717/174; 705/58

(58) Field of Classification Search ........... 382/305, 382/115; 717/168–175; 702/2; 709/206; 235/379; 379/233, 114.05, 211.01, 133, 379/114.24; 156/332; 257/E31.121; 428/480; 370/338, 331; 707/202, 205; 430/533; 713/189–193; 342/357.1, 457, 357.07; 705/58; 369/47.1, 369/47.36, 47.53, 47.48, 59.13, 59.19
See application file for complete search history.

(56) References Cited

U.S. PATENT DOCUMENTS

| | | | | |
|---|---|---|---|---|
| 4,389,706 A | 6/1983 | Gomola et al. | ............... | 364/130 |
| 4,589,063 A | 5/1986 | Shah et al. | ................... | 364/200 |
| 4,870,591 A | 9/1989 | Cicciarelli et al. | .......... | 364/468 |
| 5,257,387 A | 10/1993 | Richek et al. | ................ | 395/800 |
| 5,416,842 A | 5/1995 | Aziz | ........................... | 380/30 |
| 5,517,494 A | 5/1996 | Green | .......................... | 370/60 |
| 5,526,489 A | 6/1996 | Nilakantan et al. | ...... | 395/200.02 |
| 5,535,276 A | 7/1996 | Ganesan | ..................... | 380/25 |
| 5,541,927 A | 7/1996 | Kristol et al. | .............. | 370/94.2 |
| 5,570,291 A | 10/1996 | Dudle et al. | ........... | 364/468.01 |
| 5,598,536 A | 1/1997 | Slaughter, III et al. | . | 395/200.16 |
| 5,608,900 A | 3/1997 | Dockter et al. | .............. | 395/613 |
| 5,613,012 A | 3/1997 | Hoffman et al. | ............ | 382/115 |
| 5,640,193 A | 6/1997 | Wellner | ........................ | 348/7 |
| 5,708,798 A | 1/1998 | Lynch et al. | ................ | 395/500 |
| 5,745,568 A | 4/1998 | O'Connor et al. | .............. | 380/4 |
| 5,764,886 A | 6/1998 | Danielson et al. | ...... | 395/184.01 |
| 5,844,554 A | 12/1998 | Geller et al. | ................ | 345/333 |
| 5,894,571 A | 4/1999 | O'Connor | .................... | 395/652 |
| 5,915,093 A | 6/1999 | Berlin et al. | ........... | 395/200.49 |
| 5,957,695 A | 9/1999 | Redford et al. | ............. | 434/307 |
| 5,991,399 A | 11/1999 | Graunke et al. | ................ | 380/4 |
| 5,991,543 A | 11/1999 | Amberg et al. | .............. | 395/712 |
| 5,995,757 A | 11/1999 | Amberg et al. | .............. | 395/712 |
| 6,003,012 A | 12/1999 | Nick | .......................... | 705/10 |
| 6,005,939 A | 12/1999 | Fortenberry et al. | .......... | 380/21 |
| 6,009,406 A | 12/1999 | Nick | .......................... | 705/10 |
| 6,012,100 A | 1/2000 | Frailong et al. | ............. | 709/250 |

(Continued)

*Primary Examiner*—Sheela C Chawan
(74) *Attorney, Agent, or Firm*—Hamilton & Terrile, LLP; Robert W. Holland

(57) ABSTRACT

Registration codes associated with applications loaded on an information handling system are stored in a registration code table by a registration code module and retrieved for use when needed by an application to perform a restricted function, such as install or maintenance functions. The registration code table is populated at manufacture of the information handling system or automatically based on user preferences as a user inputs registration codes. The registration code table is secured with authentication information on the information handling system or, alternatively, at a network location accessible by the information handling system.

20 Claims, 3 Drawing Sheets

U.S. PATENT DOCUMENTS

| | | | |
|---|---|---|---|
| 6,122,463 A * | 9/2000 | Nagatani | 399/80 |
| 6,167,383 A | 12/2000 | Henson | 705/26 |
| 6,182,275 B1 | 1/2001 | Beelitz et al. | 717/1 |
| 6,236,901 B1 | 5/2001 | Goss | 700/95 |
| 6,247,128 B1 | 6/2001 | Fisher et al. | 713/100 |
| 6,327,706 B1 | 12/2001 | Amberg et al. | 717/11 |
| 6,385,623 B1 | 5/2002 | Smith et al. | 707/200 |
| 6,385,766 B1 | 5/2002 | Doran, Jr. et al. | 717/11 |
| 6,389,403 B1 | 5/2002 | Dorak, Jr. | 705/52 |
| 6,393,539 B1 | 5/2002 | Nguyen et al. | 711/164 |
| 6,425,078 B1 | 7/2002 | Smith et al. | 713/1 |
| 6,427,091 B1 | 7/2002 | Davis et al. | 700/115 |
| 6,442,508 B1 | 8/2002 | Liao et al. | 702/186 |
| 6,564,247 B1 * | 5/2003 | Todorov | 709/206 |
| 7,266,820 B2 * | 9/2007 | Eddie et al. | 717/176 |
| 7,267,271 B2 * | 9/2007 | Rhea | 235/385 |
| 7,275,165 B2 * | 9/2007 | Mehta et al. | 713/310 |
| 7,360,212 B2 * | 4/2008 | Blake et al. | 717/175 |
| 2004/0135812 A1 * | 7/2004 | Tai et al. | 345/779 |

* cited by examiner

SYSTEM AND METHOD FOR INFORMATION HANDLING SYSTEM SOFTWARE REGISTRATION CODE MANAGEMENT

BACKGROUND OF THE INVENTION

1. Field of the Invention

The present invention relates in general to the field of information handling system software applications, and more particularly to a system and method for information handling system software registration code management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have tremendous flexibility in the tasks that they perform at least in part because of their ability to run a wide variety of software applications. Standardized operating system platforms, such as WINDOWS and LINUX, typically support the interaction of other types of software applications with information handling system components to perform desired tasks. For example, the OFFICE suite of applications run on information handling systems over the WINDOWS operating system to perform word processing, spreadsheet and presentation functions. Other common types of applications have functions varying from supporting networking, such as virtual private networks, to playing multimedia, such as DVD movies, and playing games, such as chess. Application developers and information handlings system manufacturers generally try to have applications install and run on information handling systems in as seamless a manner as possible. In some instances, information handling system manufacturers install applications as part of the manufacture process and provide support with purchased systems, such user manuals and system recovery media. In other instances, applications are sold separately for installation by a user from various media, such as CDs, DVDs and network locations.

One difficulty often faced by application developers is that individuals and businesses sometimes pirate applications, both intentionally and unintentionally. Although a wide variety of security measures are available for reducing piracy or catching pirates, the most simple piracy prevention tool is generally considered the securing of an application with a unique registration code, typically known as a product identification code (PIC) or software registration code (SRC). These registration codes are typically included with the user manual or on the physical medium that comes with an application or an information handling system having the application installed. When the user attempts to install or change an application, such as with updates that require the use of a CD or a network download, the user typically must have the registration code. In this manner, the physical media included with the application is required to use the application since the registration code is associated with the physical media. This prevents widespread copying of an application for general public use, however, it also is viewed a nuisance by users, especially if the physical media having the registration code is lost or misplaced. In such an event, the user typically calls the application developer or information handling system manufacturer to attempt to get the application working.

SUMMARY OF THE INVENTION

Therefore a need has arisen for a system and method which manages information handling system software registration codes.

In accordance with the present invention, a system and method are provided which substantially reduce the disadvantages and problems associated with previous methods and systems for managing information handling system software application registration codes. Software application registration codes associated with applications loaded on an information handling system are stored to be automatically accessible by the applications if needed to perform restricted functions.

More specifically, a registration code module is stored on an information handling system to manage registration codes of applications loaded on the information handling system. An auto save module detects a user input of a registration code, such as at installation of an application, and saves the registration code to a registration code table according to predetermined parameters, such as automatically without a separate user request or automatically with a user confirmation. In addition, the registration code table is populated at manufacture of the information handling system with registration codes for applications loaded on the information handling system as part of the manufacture process. A registration API of the registration code module receives calls from applications when a registration code is needed and automatically provides the registration codes to the applications, such as for application installations or maintenance. An import/export interface supports communication by the registration code module through a network interface with a network location, such as for remote storage of registration codes or for remote access for use by technical support to aid in information handling system maintenance.

The present invention provides a number of important technical advantages. One example of an important technical advantage is that users are less likely to lose the software application registration codes for applications associated with an information handling system. Automated saving of the registration codes under password protection reduces the amount of user interaction when registration codes are needed, such as at install, during maintenance or for communication with the support technicians. Inclusion of a registration code table at the time of manufacture of an information handling systems provides a secure electronic version for users and the manufacturer to reference. Networked-based import to and export from a registration code table ensures an up to date reference source accessible by the manufacturer of the information handling system if a user needs technical support. Further, in the event the user cannot access a registration code on an information handling system, the user may use another information handling system to access the registration code through a network.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A registration code table stores software application registration codes associated with applications loaded on an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
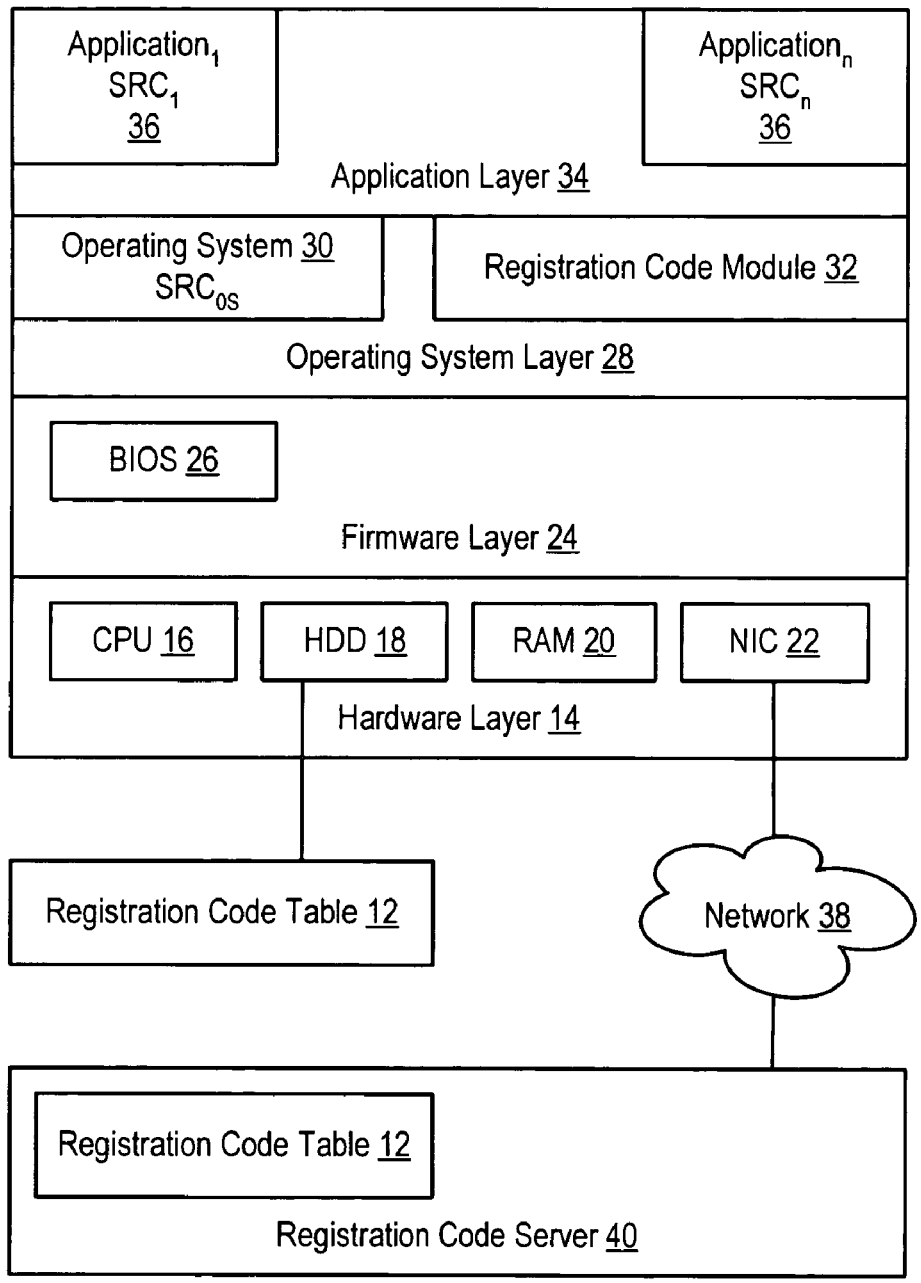
FIG. 1 depicts a block diagram of an information handling system having application registration codes stored in a registration code table.

Referring now to FIG. 1, a block diagram depicts an information handling system 10 having application registration codes stored in a registration code table 12. Information handling system 10 is built with a physical hardware layer 14 having a plurality of processing components that process information, such as a CPU 16, a hard disk drive (HDD) 18, RAM 20 and a network interface card (NIC) 22. Above hardware layer 14, a firmware layer 24 coordinates the basic physical interaction of the processing components, such as with a BIOS 26. An operating system layer 28 includes an operating system 30, such as WINDOWS or LINUX, which supports the interaction of applications 36 operating at an application layer 34. A registration code module 32 resides at the operating system layer to manage the software application registration codes associated with information handling system 10, such as operating system registration code $SRC_{OS}$ and application registration codes $SRC_1$ through $SRC_n$. Registration code module 32 manages registration codes in registration code table 12 stored locally in hard disk drive 18, stored remotely accessible through NIC 22 and network 38, such as the Internet, at a distally located registration code server 40 or stored in a removable medium, such as a USB key. In alternative embodiments, registration code module 32 and registration code table 12 may reside at other layers of information handling system 10, such as application layer 34 or firmware layer 24. In one embodiment, registration code table 12 is populated at manufacture of information handling system 10 with the registration codes for applications loaded during imaging of information handling system 10 so that the registration codes are electronically available to a user at delivery of a newly-purchased system.

Figure 2:
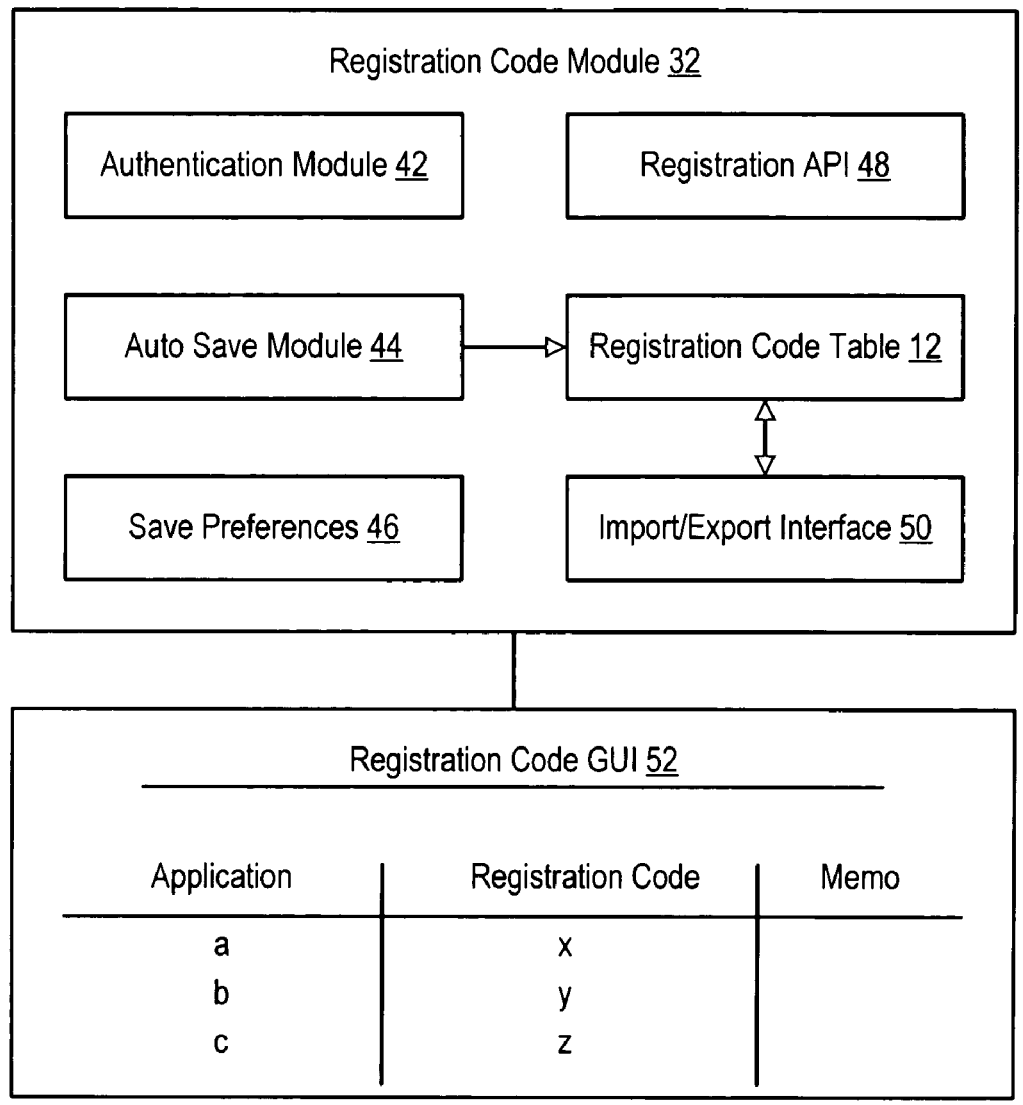
FIG. 2 depicts a block diagram of a system for managing registration codes of applications loaded on an information handling system.

Referring now to FIG. 2, a block diagram depicts a system for managing registration codes of applications loaded on an information handling system. Registration code module 32 has an authentication module 42 that provides password and user identification protection for access to the module, such as with Passport for WINDOWS. An auto save module 44 is configurable to save registration codes according to save preferences 46. For instance, when auto save module 44 detects that a user has input a software application registration code auto save module 44 can automatically save the registration code to table 12 without further input by the user, can require confirmation to a prompt by the user before saving the registration code to table 12, or can take no action. A registration application programming interface (API) is available for applications to call their registration code from table 12 when the code is needed to perform a restricted function, such as at installation or during maintenance. Alternatively, an import/export interface 50 supports user interaction with registration code table 12 to manually import and export registration codes. For instance, when queried by an application for a registration code, a registration code graphical user interface (GUI) is presented by import/export interface 50 to allow the user to copy the applicable registration code, such as in a password protected zip containing a text, XML or comma delimited file, or as a text, XML or comma delimited file. In addition the user may enter metadata fields through registration code GUI 52 to describe applications or make notations. Import/export interface 50 also supports network communication of registration code information to allow, for instance, a manufacturer or third party to keep a duplicate of registration code table 12 for aid in recovery of a failed information handling system. Thus, for instance, the user may retrieve codes for a failed system by connecting with the stored codes through the network using an operational system.

Figure 3:
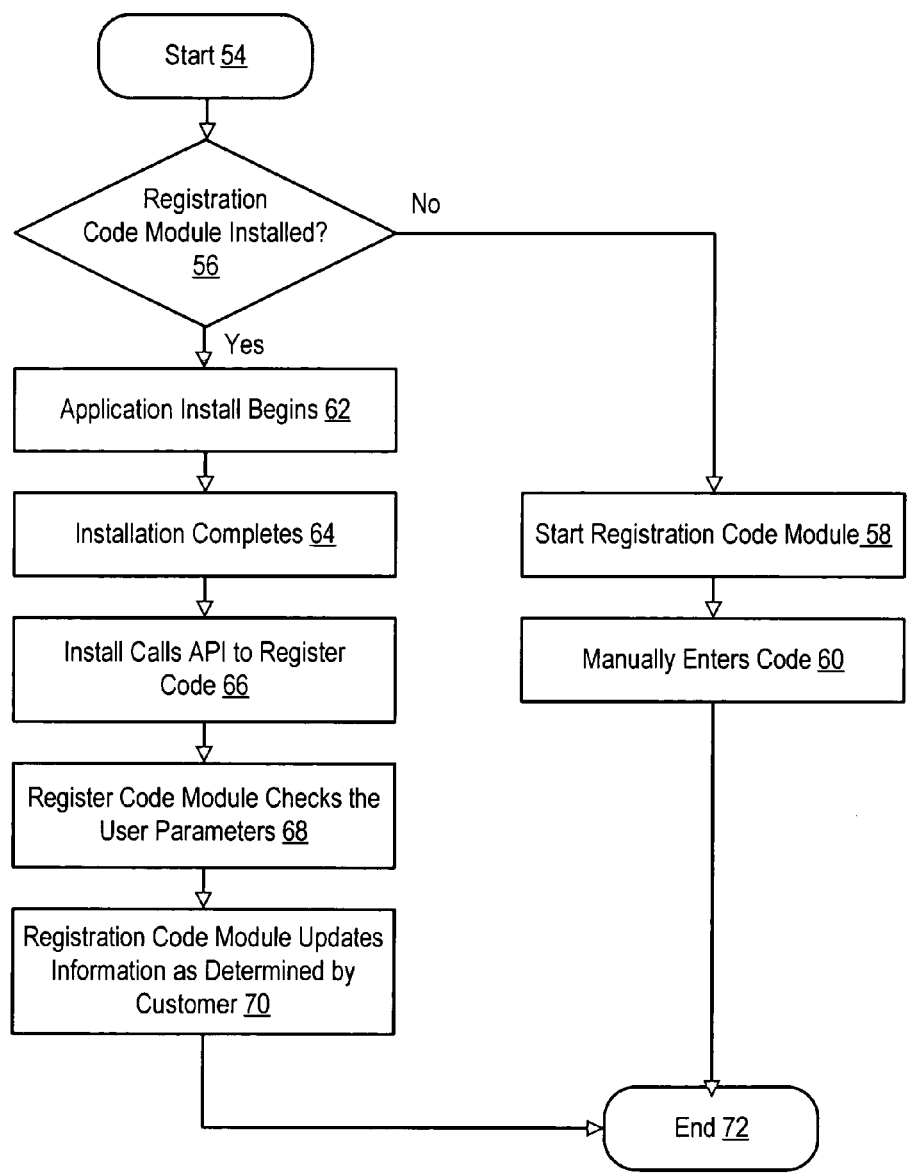
FIG. 3 depicts a flow diagram of a process for managing registration codes of applications loaded on an information handling system.

Referring now to FIG. 3, a flow diagram depicts a process for managing registration codes of applications loaded on an information handling system. At step 54, installation begins of an application that is supported by a registration code module. Information handling system interaction with the registration code module may be initiated by instructions within the application, instructions within the operating system, or instructions of a separate module that monitors application installation. At step 56 a determination is made of whether a registration code module is installed on the information handling system. If not, the process continues to step 58 at which the registration code module is loaded onto the information handling system and step 60 for the manual entry of the registration code to install the application. If at step 56 the registration code module is detected already installed on the information handling system, the process continues to step 62 to begin the installation of the application. Once installation of the application is completed at step 64, the process continues to step 66 at which the application installer calls the registration API to register the code. At step 68, the registration code module checks the user preferences for storing registration codes so that at step 70 the registration code table is updated according to the user preferences. For instance, updates can be made automatically, can be made with or without user notification, can be made with or without user confirmation, can be automatically declined or can be automatically made to a network location, such as at the manufacturer of the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    plural processing components disposed in the housing and operable to process information, the processing components including at least one storage device;
    plural applications operable to run in cooperation with the processing components, at least one of the applications having an associated registration code, the application requiring input of the registration code to perform one or more associated functions; and
    a registration code module stored on the storage device and interfaced with the at least one application, the registration code module executing on a processing component to save the registration codes on the storage device and to provide each of the at least one applications with the associated registration code to perform the associated function.

2. The information handling system of claim 1 wherein the registration code module is further operable to automatically save the registration codes according to a selected of plural save parameters.

3. The information handling system of claim 2 wherein the save parameters comprise an automatic save of the registration code at installation of the associated application.

4. The information handling system of claim 2 wherein the save parameters comprise an automatic prompt querying whether to save the registration code.

5. The information handling system of claim 1 wherein the registration code module provides the registration code to the application as a XML file.

6. The information handling system of claim 1 wherein the registration code module provides the registration code to the application as a comma delimited file.

7. The information handling system of claim 1 wherein the registration code module is further operable to present stored registration codes for viewing at a display.

8. The information handling system of claim 1 wherein the processing components comprise a network interface, the registration code module further operable to communicate through the network interface to export or import registration codes.

9. A method for managing software application registration codes comprising:
    installing with a processor plural applications on the information handling system, each of the installed applications having an associated registration code, the registration code required to perform one or more restricted functions with the associated application;
    storing with the processor the plural registration codes on the information handling system at a common location; and
    retrieving with the processor one or more of the plural registration codes to perform a restricted function with an associated application.

10. The method of claim 9 wherein retrieving further comprises:
    detecting a request by an application for a stored registration code; and
    automatically inserting the registration code in the application.

11. The method of claim 9 wherein retrieving further comprises:
    detecting a request by a user to view the registration codes;
    receiving a user selection of one of the registration codes; and
    copying the selected registration code to an application.

12. The method of claim 11 wherein the registration code comprises a text file.

13. The method of claim 11 wherein the registration code comprises a comma delimited file.

14. The method of claim 9 wherein:
    installing further comprises installing the applications during manufacture of the information handling system; and
    saving further comprises saving the registration codes during manufacture of the information handling system.

15. The method of claim 9 wherein:
    installing further comprises installing an application by an end user of the information handling system; and
    saving further comprises automatically saving a registration code input by the end user during the installing of the application.

16. The method of claim 9 wherein:
    installing further comprises installing an application by an end user of the information handling system; and
    saving further comprises presenting the end user an option to save a registration code input by the end user during the installing of the application.

17. A system for saving software application registration codes, the system comprising:
    an application registration code table storing plural application registration codes, each stored registration code associated with an application loaded on an information handling system; and
    a registration code module loaded on the information handling system and executing on a processor to detect a request by an application running on the information handling system for the registration code associated with that application and to communicate the registration code to the requesting application.

18. The system of claim 17 wherein the application registration code table is stored on the information handling system.

19. The system of claim 17 further comprising an auto save module loaded on the information handling system, the auto save module operable to detect input of a registration code to an application running on the information handling system and to save the registration code in the registration code table.

20. The system of claim 19 wherein the application registration code table is stored at a network location distal the information handling system, the system further comprising a network interface operable to export registration codes from the auto save module to the network location and to import registration codes from the network location to the information handling system.

* * * * *

UNITED STATES PATENT AND TRADEMARK OFFICE
CERTIFICATE OF CORRECTION

PATENT NO. : 7,623,684 B2 Page 1 of 1
APPLICATION NO. : 11/184222
DATED : November 24, 2009
INVENTOR(S) : Kanchwala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this

Twenty-sixth Day of October, 2010

David J. Kappos
*Director of the United States Patent and Trademark Office*